United States Patent
Hatch et al.

(10) Patent No.: US 8,974,158 B1
(45) Date of Patent: Mar. 10, 2015

(54) LACED STRAPPING SYSTEM FOR SECURING LOADS IN OPEN VEHICLE BEDS

(71) Applicants: Rob Edward Hatch, Madera, CA (US); Anita Marie Hatch, Madera, CA (US)

(72) Inventors: Rob Edward Hatch, Madera, CA (US); Anita Marie Hatch, Madera, CA (US)

(*) Notice: Subject to any disclaimer, the term of this patent is extended or adjusted under 35 U.S.C. 154(b) by 0 days.

(21) Appl. No.: 13/905,027

(22) Filed: May 29, 2013

Related U.S. Application Data

(60) Provisional application No. 61/653,203, filed on May 30, 2012.

(51) Int. Cl.
  *B61D 45/00* (2006.01)
  *B60P 7/14* (2006.01)
  *B60P 7/08* (2006.01)

(52) U.S. Cl.
  CPC .................................. *B60P 7/0876* (2013.01)
  USPC ............... 410/44; 410/117; 410/118; 410/97; 410/98

(58) Field of Classification Search
  USPC ............... 410/97, 96, 118, 117, 100; 248/499
  See application file for complete search history.

(56) References Cited

U.S. PATENT DOCUMENTS

| | | | | |
|---|---|---|---|---|
| 2,705,461 | A * | 4/1955 | Campbell | 410/97 |
| 3,011,820 | A * | 12/1961 | Frieder et al. | 294/77 |
| RE33,232 | E * | 6/1990 | Fausett et al. | 211/87.01 |
| 5,452,973 | A * | 9/1995 | Arvin | 410/118 |
| 6,353,982 | B1 * | 3/2002 | Looker et al. | 24/302 |
| 6,866,453 | B2 * | 3/2005 | Looker et al. | 410/96 |
| 7,942,618 | B1 * | 5/2011 | Looker | 410/97 |
| 8,297,895 | B2 * | 10/2012 | Wienke et al. | 410/118 |

* cited by examiner

*Primary Examiner* — Glenn Dayoan
*Assistant Examiner* — Sunsurraye Westbrook
(74) *Attorney, Agent, or Firm* — Plager Schack LLP

(57) ABSTRACT

Some embodiments include a novel laced strapping system that provides a plurality of attachment points by which a tie-down lace can adjust the fit of a cargo mesh webbing to secure loads of items in an open bed of a vehicle. In some embodiments, the vehicle is a pick-up truck with a cargo bed. In some embodiments, the mesh webbing comprises a first truck bed mesh, a second truck bed mesh, and the plurality of attachment points. In some embodiments, tie-down lace interconnects the attachment points to secure together the first mesh and the second mesh.

12 Claims, 2 Drawing Sheets

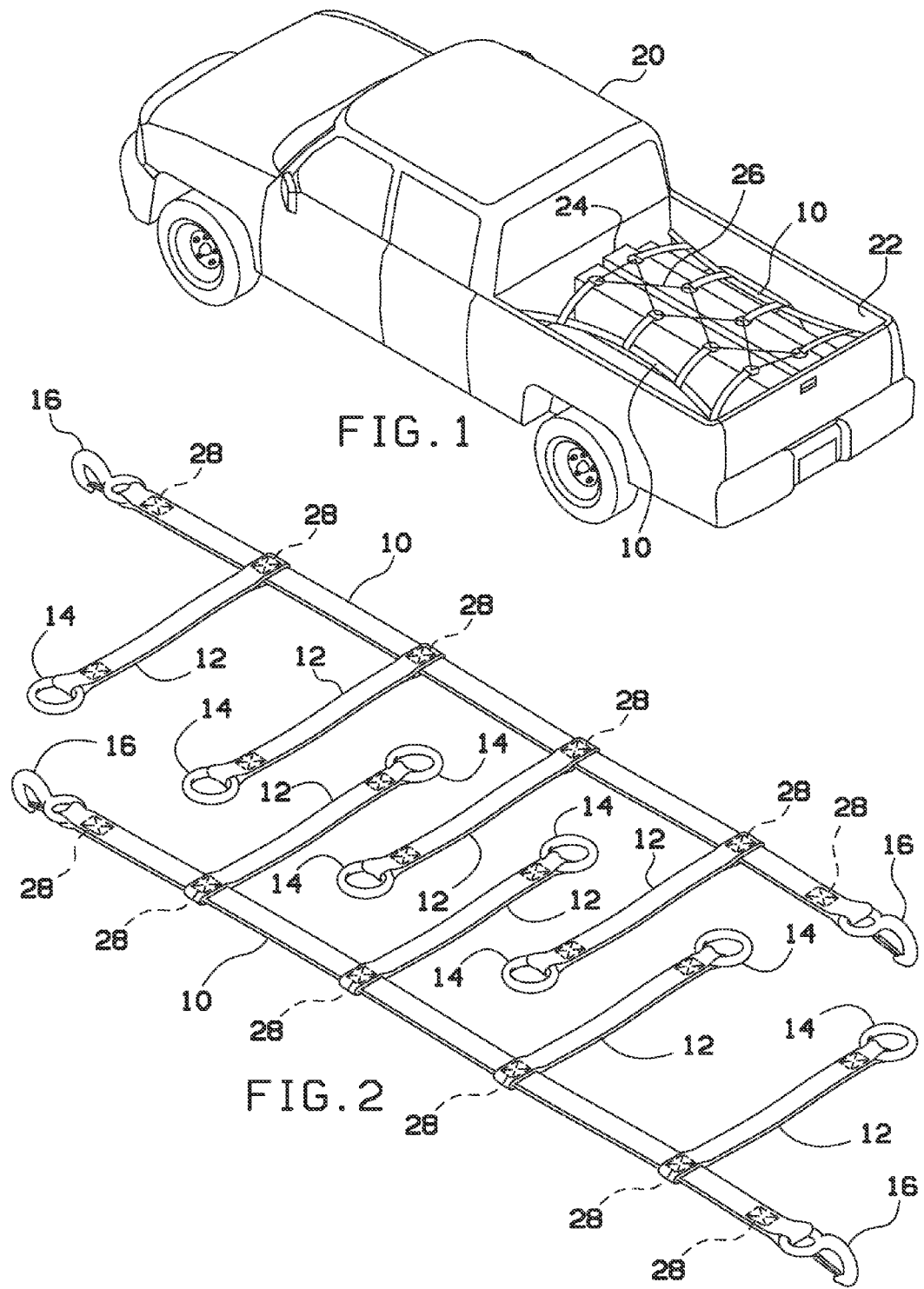

LACED STRAPPING SYSTEM FOR SECURING LOADS IN OPEN VEHICLE BEDS

CLAIM OF BENEFIT TO PRIOR APPLICATION

This application claims benefit to U.S. Provisional Patent Application 61/653,203, entitled "Truck Lace, a strapping system for securing loads in the bed of a pick-up" filed May 30, 2012. The U.S. Provisional Patent Application 61/653,203 is incorporated herein by reference.

BACKGROUND

People often need to haul loads of items between locations. For instance, a person building an addition to a house may need to haul a load of lumber from a lumber provider to the construction site on the premises of the house being added to. When an open bed of a vehicle is used to carry a load, some or all of the items of the load are shaken or jarred during the commute. For example, the vehicle is likely going to travel over bumps in the road, pot holes in the road, or travel up or down road elevations (e.g., hills, mountains, multi-level parking structures, etc.). The loads carried in the beds of vehicles, therefore, are at risk of falling out of the bed unless they are secured. This is problematic for drivers who have to carry one or more loads in open beds because the items are not safely secured, and thus, items can get damaged or people can get hurt when items fall out.

To overcome some of the risk of losing items being hauled, many people use covers on top of the loads. However, securing a load with a cover presents its own challenges because most vehicles with open beds (e.g., pick-up tracks) have inadequate structure for securing the cover to the truck bed. For example, securing a load in a pick-up truck can be difficult due to a lack of existing tie-down points within the truck bed.

Ratchet straps that connect at two points are used by some to secure loads in open truck beds. Ratchet straps, however, go only from one point to another, requiring multiple straps and existing tie-downs in the truck bed. Spider web style nets are designed to connect to the four corners of a truck bed and to cover loads having existing in a truck bed, secured at the four corners, limiting how it can be used to cover the load.

Thus, what is needed is a strapping system in open vehicle beds which can be used to secure any of several items, including yard trimmings, camping equipment, furniture items, and any other item that is sufficiently large to require hauling in an open track bed.

BRIEF SUMMARY

Some embodiments of the invention include a novel laced strapping system that provides a plurality of attachment points by which a tie-down lace can adjust the fit of a cargo mesh webbing to secure loads of items in an open bed of a vehicle. In some embodiments, the vehicle is a pick-up truck with a cargo bed. In some embodiments, the mesh webbing comprises a first truck bed mesh, a second truck bed mesh, and the plurality of attachment points. In some embodiments, tie-down lace interconnects the attachment points to secure together the first mesh and the second mesh.

In some embodiments, each long strap includes hooks for securing the corresponding mesh to the corner attachment points inside the truck bed. In some embodiments, each long strap includes a plurality of short straps that project perpendicularly out from the long strap and have attachment points that allow the tie-down lace to connect to each short strap. When the tie-down lace is tightened, the short straps get tightened, and thereby secure the cargo to the truck bed.

In some embodiments, the plurality of O-rings comprise a set of four O-rings attached to four short straps at four mesh attachment points and a set of four O-rings attached to four short straps at four attachment points.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matters can be embodied in other specific forms without departing from the spirit of the subject matters.

BRIEF DESCRIPTION OF THE DRAWINGS

Having described the invention in general terms, reference is now made to the accompanying drawings, which are not necessarily drawn to scale, and wherein:

FIG. 1 conceptually illustrates a perspective view of an example laced strapping system of some embodiments.

FIG. 2 conceptually illustrates a perspective view of a pair of meshes of an example laced strapping system in some embodiments.

DETAILED DESCRIPTION

Figure 3:
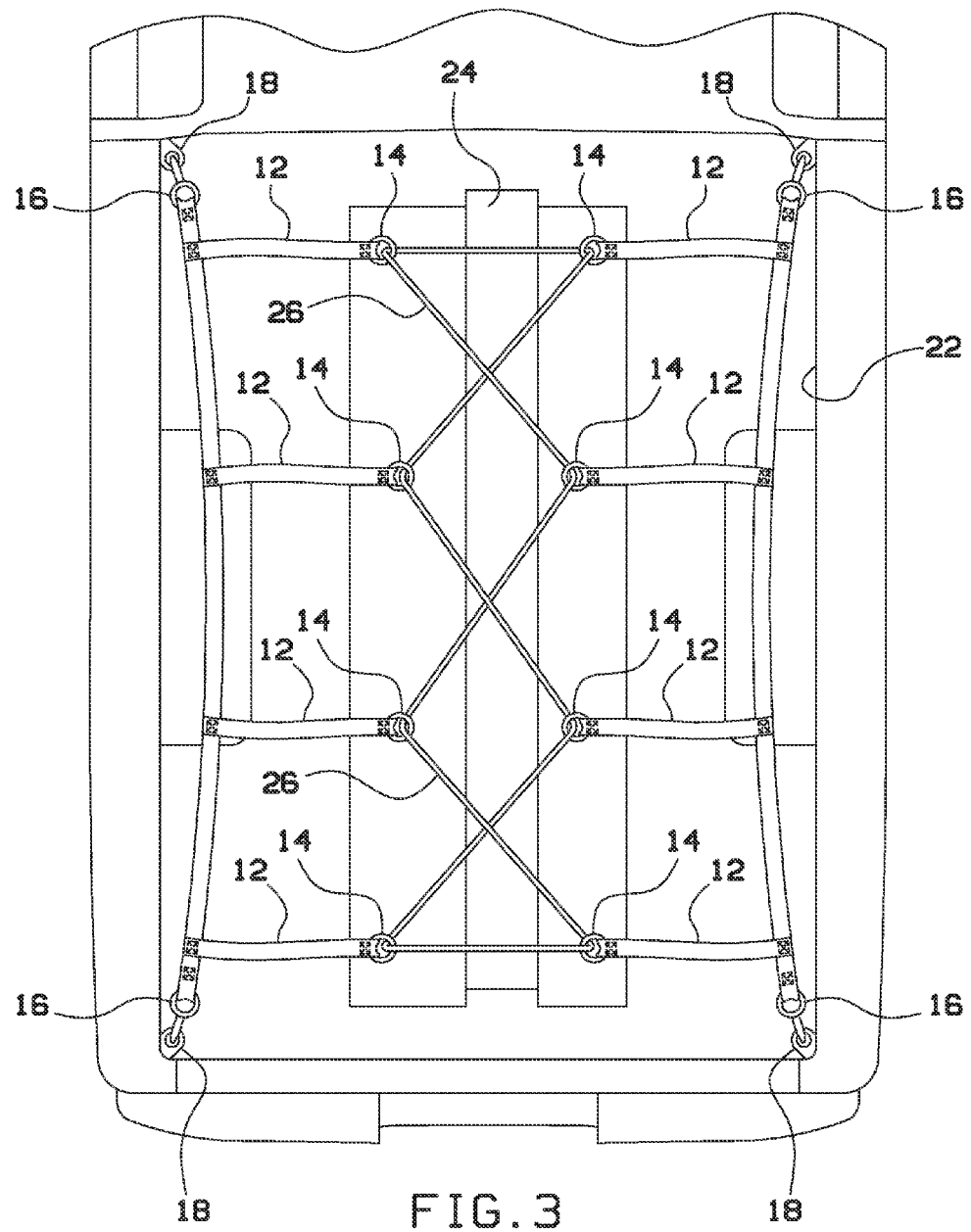
FIG. 3 conceptually illustrates a top view of a laced strapping system in some embodiments during use.

In the following detailed description, several examples and embodiments of the invention are described. However, it will be clear to a person skilled in the art that the invention is not limited to the embodiments set forth and can be adapted for any of several other uses.

Some embodiments of the invention include a novel laced strapping system that provides a plurality of attachment points by which a tie-down lace can adjust the fit of a cargo cover to secure loads of items in an open bed of a vehicle. In some embodiments, the vehicle is a pick-up truck with an open bed. In some embodiments, the cargo cover comprises a first truck bed mesh, a second truck bed mesh, and the plurality of attachment points. In some embodiments, tie-down lace interconnects the plurality of attachment points to secure together the first mesh and the second mesh.

FIG. 1 conceptually illustrates a perspective view of an example laced strapping system of some embodiments. As shown in this figure, the laced strapping system is used in the bed 22 of a truck 20 to secure cargo 24. In particular, the laced strapping system includes a pair of meshes 30, a pair of long straps 10, and a tie-down lace 26 which secures together the pair of meshes 30 over the cargo 24.

The truck bed 22 is an open bed for hauling loads of materials, equipment, and other items. The truck bed can haul loads of several sizes. The truck bed is contained by panels of the truck. The back containing panel of the truck is a door that opens for loading and unloading items. The truck bed includes four attachment points at the corners inside the truck bed.

Each mesh 30 in some embodiments attaches to one side of the truck bed 22. The meshes are attached to the inside of the truck bed 22 by the long straps 10. The long strap 10 corresponding to a mesh attaches to two of the four corner points inside the truck bed 22 to lock the mesh to one side of the truck bed. The meshes are free from cargo 24 in the truck bed. In some instances, the meshes are laid over approximately half of the cargo 24, while in other embodiments, the meshes line the cargo along its sides.

The tie-down lace 26 of some embodiments connects the meshes together to secure the cargo 24 in the truck bed 22. The tie-down lace 26 in some embodiments is a lacing rope. The lacing rope is one of a natural fiber rope, a polyester rope, a polypropylene rope, and a nylon rope. In other embodiments, the tie-down lace 26 is one of a strap and a bungee cord.

As shown in FIG. 1, the cargo 24 is secured within the truck bed 22 by the meshes, which are secured by the long straps 10 to the corner attachment points inside the truck bed 22 and which are connected together by the tie-down lace 26. Although the example cargo 24 shown in this figure is only a small load that fits within the containing walls of the truck bed, in some cases the load is larger. For instance, if more cargo will be loaded into the bed 22, the tie-down lace 26 can be released or loosened to free one or both of the meshes 30. The free meshes can be pulled back over the truck wall while the additional cargo is added to the load. Once all the cargo is loaded, the meshes 30 can be reconnected by the tie-down lace 26. In this way, the laced strapping system can secure many sized cargo loads, from small cargo loads that fit within the containing walls of the truck bed, to large cargo loads with items that are piled much higher than the walls of the truck bed.

In some embodiments, each long strap includes hooks for securing the corresponding mesh to the corner attachment points inside the truck bed. In some embodiments, each long strap includes a plurality of short straps that project perpendicularly out from the long strap and have attachment points that allow the tie-down lace to connect to each short strap. When the tie-down lace is tightened, the short straps get tightened, and thereby secure the cargo to the truck bed.

FIG. 2 conceptually illustrates a perspective view of a pair of meshes of an example laced strapping system in some embodiments. As shown, each of the truck bed meshes 30 comprise a long strap 10, a plurality of locking hooks for securing the long strap to corner attachment points inside the truck bed, a plurality of short straps 12 connected to the long strap, and a plurality of O-rings 14 connected to the short straps.

The long straps 10 in some embodiments secure the meshes to the inside of the truck bed and to each other. Each long strap includes attachment points for the locking hooks and the short straps. In some embodiments, the attachment points are fastening connectors. In some embodiments, each end of the long strap wraps around a ring connector of the locking hook and is secured against the return side of the long strap by a fastening connector. For instance, the fastening connector might be a button, a snap, an interlocking fastener, or any other type of secure fastener. Each long strap also includes fasteners at regular intervals that are approximately evenly spaced.

The locking hooks 16 attach to the corner attachment points inside the truck bed to secure the long strap to the inside of the truck bed. In some embodiments, the locking hooks are attached to opposing ends of the long strap. The locking hooks of some embodiments lock onto tie-down brackets at the corner attachment points inside the truck bed.

In some embodiments, the locking hooks 16 are swappable by opening an end of the long strap that is wrapped around a ring connector of the locking hook, removing the locking hook, and replacing the locking hook with a different locking hook.

The short straps 12 are connected to the long strap at a plurality of attachment points 28 along the long strap. In some embodiments, the short straps are stitched to the long strap at the attachment points 28. In some embodiments, the short straps include an islet through which the long strap 10 is slid into. In these embodiments, each short strap is secured to the long strap at an attachment point 28 by a connecting a fastener on the inside of the islet to a locking head located on the long strap proximate to the attachment point 28. In some embodiments, the number of short straps connected to a long strap is adjustable for any load of cargo. For example, certain cargo loads with smaller items may need to include more than the four short straps of each mesh shown in FIG. 2. By increasing the number of short straps (e.g., by sliding the islet of the short strap over an end of the long strap) a person can fine tune the security providing by the laced strapping system.

The O-rings 14 of some embodiments allow the tie-down lace 26 to be easily connected to all of the short straps. Although any kind of attachment point fastener that allows the tie-down lace to connect to the short straps can be used, the O-rings can work with any kind of tie-down lace that might be used.

Each of the short straps 12 and the long straps 10 are polyester straps in some embodiments. The straps of other embodiments include at least one of nylon traps, polypropylene straps, and natural fiber straps.

As shown in FIG. 2, the eight points through which the tie-down lace can secure loads of various shapes and sizes in the pick-up truck bed include O-rings. The eight rings are spaced four to a side and can be hung outside of the truck bed while the load is put in, allowing for simple securing of the cargo load. Also, because modern pick-ups typically come with four tie-down loops, the laced strapping system attaches with the locking hooks to the four tie-down loops, and thereby secures the laced strapping system within the bed of the truck.

From a functional standpoint, any rope can be laced through the O-rings, tightened, and secured. As necessary, more or less short straps can be included to increase or decrease the mesh coverage. The rope can be laced through in a crossed pattern (e.g., like tying a shoe) or parallel pattern (e.g., lacing through adjacent rings along one of the long straps, then across to the opposing ring of the other long strap, and up through the ring adjacent to the opposing ring, then back to a ring along the original long strap, etc.)

In some embodiments, the tie pattern includes multiple paths through the O-rings. In some cases, alternating patterns are used for multiple paths securing through the O-rings. For instance, a first path through the O-rings can be a crossed pattern (e.g., shoe tying style) and a second path through the O-rings can be a parallel pattern. In this way, the laced strapping system can be used with yard trimmings, camping equipment, furniture, and other items. In other cases, multiple redundant patterns are used. For example, first and second cross patterns through the loops or first and second parallel patterns through the loops. In this way, the laced strapping system can be used to secure nearly any kind of cargo, including, for example, yard trimmings, camping equipment, furniture, and other items.

In some embodiments, a set of specifications define a plurality of characteristics of the laced strapping system. The set of specifications of some embodiments includes using polyester strapping of a particular width, metal fixed eye boat snaps of appropriate size for the mesh webbing, metal round O-rings of a particular width, and a specific strength rating for thread to secure the short and long straps at the plurality of connection points.

In some embodiments, the specifications require the particular width of the polyester strapping to be one of one inch wide, one and a half inch wide, and two inches wide. In some embodiments, the width is indicated to be any width that is needed.

In some embodiments, the specifications require the fixed eye boat snaps to be made of metal. In some embodiments, the size is indicated to be any size that is needed for mesh webbing.

In some embodiments, the specifications require the O-rings to be made of metal and to be one and a half inches in diameter. In some embodiments, the diameter is indicated to be any diameter that is appropriate for mesh webbing.

In some embodiments, the specifications require a specific strength rating for thread that is used to secure the short straps to the long strap and to secure the folded ends of the long strap around the locking hooks. In these embodiments, instead of using releasable fasteners, the connection points are threaded. In some embodiments, the strength rating is for the thread used to secure the straps at the connection points is 138 Thread, commercial.

The set of specifications are required in some embodiments to ensure that cargo loads are secured in the truck bed as the truck travels over any of several different surfaces. For example, the truck may travel over smooth paved surfaces, paved surfaces with a number of pot holes and other abutments and depressions, gravel roads, dirt roads and paths, soft grass or soil surfaces, etc.

FIG. 3 conceptually illustrates a top view of a laced strapping system in some embodiments during use. As shown in this figure, the laced strapping system secures a cargo load 24 within the bed 22 of a truck. The long strap locking hooks 16 secure to the tie down brackets 18 in the corners of the truck bed. Each of the short straps 12 is projected toward the middle of the truck bed so that the tie-down lace can be threaded through the O-rings, and thereby connect together the mesh webbing at each side of the truck bed 22.

Although several examples described by reference to FIGS. 1-3, above, pertain to a specific size truck bed, in some cases, the laced strapping system is adjustable for different truck bed dimensions. In other embodiments, specific dimensions and characteristics of the laced strapping system are specified for specific truck bed dimensions. For instance, the lace strapping system may include specifications for a type of truck that has a long truck bed. Another, different type of truck may include a truck bed that is shorter in length. In some cases, the truck bed is approximately square. In some embodiments, the specifications further define material qualities of the components of the laced strapping system.

While the invention has been described with reference to numerous specific details, one of ordinary skill in the art will recognize that the invention can be embodied in other specific forms without departing from the spirit of the invention. For instance, many of the figures illustrate conventional baseball bats and training bats intended for practicing baseball hitting drills. However, many of the illustrated training bats could be intended for practicing softball hitting drills. Thus, one of ordinary skill in the art would understand that the invention is not to be limited by the foregoing illustrative details, but rather is to be defined by the appended claims.

We claim:

1. A laced strapping system for securing a cargo load in a truck bed, the laced strapping system comprising:
   a first truck bed mesh comprising:
      a first mesh long strap;
      a plurality of first mesh short straps attached to the first mesh long strap; and
      a plurality of first attachment points, each first attachment point being attached to an end of a first mesh short strap distal to the first mesh long strap;
   a second truck bed mesh comprising:
      a second mesh long strap;
      a plurality of second mesh short straps attached to the second mesh long strap; and
      a plurality of second attachment points, each second attachment point being attached to an end of a second mesh short strap distal to the second mesh long strap; and
   a tie-down lace configured to be laced through the plurality of first attachment points and the plurality of second attachment points, securing the cargo load in the truck bed,
   wherein when the plurality of first attachment points and the plurality of second attachment points are not attached by the tie-down lace, the first truck bed mesh and the second truck bed mesh are distinct and separate.

2. The laced strapping system of claim 1, further comprising a plurality of first locking hooks attached to the first mesh long strap and a plurality of second locking hooks attached to the second mesh long strap, the locking hooks configured to lock the first truck bed mesh and the second truck bed mesh to corner attachment points inside the truck bed.

3. The laced strapping system of claim 1, wherein:
   the first mesh short straps project out from the first mesh long strap of toward the middle of the truck bed; and
   the second mesh short straps project out from the second mesh long strap toward the middle of the truck bed.

4. The laced strapping system of claim 3, further comprising a plurality of O-rings through which the tie-down lace is threaded, wherein each O-ring connected to a different short strap.

5. The laced strapping system of claim 3, wherein the short straps project substantially perpendicularly outwards from their respective long strap.

6. The laced strapping system of claim 1, wherein the tie-down lace is made from a member selected from the group consisting of a natural fiber rope, a polyester rope, a polypropylene rope, and a nylon rope.

7. The laced strapping system of claim 1, wherein the truck bed meshes are each made from a member selected from the group consisting of a natural fiber mesh, a polyester mesh, a polypropylene mesh, and a nylon mesh.

8. The laced strapping system of claim 1, further comprising a set of specifications that define the mesh webbing for the dimensions of a particular truck bed.

9. The laced strapping system of claim 8, wherein the laced strapping system is designed to engage with a truck having a long truck bed.

10. The laced strapping system of claim 8, wherein the laced strapping system is designed to engage with a truck having a truck bed that is approximately square.

11. The laced strapping system of claim 1, wherein each of the short straps comprises an islet through which its respective long strap is slid, securing the short strap to the long strap.

12. The laced strapping system of claim 11, further comprising a fastener on an inside of the islet configured to engage with a locking head located on the long strap.

* * * * *